(12) United States Patent
Buswell

(10) Patent No.: US 8,914,785 B2
(45) Date of Patent: Dec. 16, 2014

(54) PROVIDING VIRTUAL APPLIANCE SYSTEM FIRMWARE IMAGES

(75) Inventor: John I. Buswell, Athens, OH (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 13/562,138

(22) Filed: Jul. 30, 2012

(65) Prior Publication Data

US 2014/0033189 A1 Jan. 30, 2014

(51) Int. Cl.
*G06F 9/445* (2006.01)

(52) U.S. Cl.
USPC ............ 717/170; 717/168; 717/173; 717/177

(58) Field of Classification Search
None
See application file for complete search history.

(56) References Cited

U.S. PATENT DOCUMENTS

| | | | |
|---|---|---|---|
| 7,073,053 B1 | 7/2006 | Oz et al. | |
| 7,487,343 B1 | 2/2009 | Insley et al. | |
| 7,650,490 B2 | 1/2010 | Barron, Jr. et al. | |
| 7,890,689 B2 * | 2/2011 | Lam et al. | 711/6 |
| 8,086,836 B2 * | 12/2011 | Chong et al. | 713/2 |
| 8,544,016 B2 * | 9/2013 | Friedman et al. | 718/104 |
| 2008/0028145 A1 * | 1/2008 | Lecomte et al. | 711/114 |
| 2008/0028401 A1 * | 1/2008 | Geisinger | 718/1 |
| 2008/0178143 A1 * | 7/2008 | Dougan et al. | 717/100 |
| 2008/0215796 A1 * | 9/2008 | Lam et al. | 711/100 |
| 2009/0007105 A1 * | 1/2009 | Fries et al. | 718/1 |
| 2009/0037722 A1 | 2/2009 | Chong et al. | |
| 2009/0328170 A1 * | 12/2009 | Williams et al. | 726/7 |
| 2010/0058045 A1 | 3/2010 | Borras et al. | |
| 2010/0058087 A1 | 3/2010 | Borras et al. | |
| 2010/0161929 A1 | 6/2010 | Nation et al. | |
| 2010/0232290 A1 * | 9/2010 | Wong et al. | 370/229 |
| 2011/0099267 A1 * | 4/2011 | Suri et al. | 709/224 |
| 2011/0126186 A1 * | 5/2011 | Srinivasan | 717/171 |
| 2011/0126192 A1 * | 5/2011 | Frost et al. | 717/178 |
| 2011/0153697 A1 | 6/2011 | Nickolov et al. | |
| 2011/0173430 A1 | 7/2011 | Kacin et al. | |
| 2011/0238969 A1 * | 9/2011 | Warkentin et al. | 713/2 |
| 2012/0011503 A1 * | 1/2012 | Filali-Adib et al. | 718/1 |
| 2013/0024856 A1 * | 1/2013 | Yusupov | 718/1 |
| 2013/0024857 A1 * | 1/2013 | Yusupov | 718/1 |
| 2013/0179872 A1 * | 7/2013 | Kuzmack et al. | 717/173 |
| 2013/0191340 A1 * | 7/2013 | Ammanur et al. | 707/638 |
| 2013/0238930 A1 * | 9/2013 | Umbehocker | 714/6.32 |

FOREIGN PATENT DOCUMENTS

EP 2043320 4/2009

OTHER PUBLICATIONS

Anonymous, Method to automatically detect machine type and provision the OS with a machine-specific profile, Ip.com PriorArt database, Aug. 17, 2010, IPCOM000198935D.

* cited by examiner

*Primary Examiner* — Isaac Tecklu
(74) *Attorney, Agent, or Firm* — Shimokaji & Associates, P.C.

(57) ABSTRACT

A virtual appliance may be provided with firmware images that may be simulated in a run-time environment prior to loading into a network component. A kernel may be mapped to a virtual appliance image providing a virtual operating system image. Updates to the virtual appliance may provide updated versions of the virtual operating system image by mapping the updated virtual appliance image to an updated kernel. Various versions of the virtual operating system image may be stored and loaded into the virtual appliance without needing to downgrade a previous version of the operating system.

15 Claims, 3 Drawing Sheets

PROVIDING VIRTUAL APPLIANCE SYSTEM FIRMWARE IMAGES

BACKGROUND

The present invention relates to computer network virtualization, and more specifically, to providing virtual appliance system firmware images.

In a networking virtual appliance, an operating system is typically created and updated in sequential versions; each version relying on the previous version's updates. During boot up, a virtual BIOS loads a boot loader, which is used to allow the user to select from a choice of Linux kernels. Each Linux kernel typically shares the same local disk storage device and loads the same operating system stored on that local disk storage device. The boot loader decides which kernel to boot from and tells the kernel which local storage to use. The kernel initializes the virtual hardware, then loads the operating system stored on the local disk. The operating system typically takes control of the system from this point and loads the application.

Software upgrades to the virtual appliance may be managed according to a similar process on a per component basis. Upgrades and downgrades may be performed through a package management tool. Individual files on the operating system are upgraded individually based on association with each other. Upgrades to running applications on the virtual appliance may occur periodically and may be stored as sequential versions in the local disk. Each upgrade loaded into the virtual appliance includes its own libraries of files. However not all upgrade versions may be desirable by the user. For example, some versions of the operating system running on the virtual appliance may contain bugs or conflicts among the application(s) being run. Thus, it may become very easy for the resulting operating system that supports the application the appliance is running to become out of sync with the application. It may not be possible to simply skip back to a previously known functional version of the operating system without first sequentially downgrading each upgrade one by one. Attempts to jump back to a previous version of the operating system may create points of failure between upgraded components. Additionally, if certain library files are being employed, the software trying to perform the downgrade is using the same library files that need to be downgraded, hence creating an inexecutable situation.

SUMMARY

According to one embodiment of the present invention, a host machine comprises a central processing unit (CPU); a storage area connected to the CPU wherein the storage area includes a virtual operating system (OS) image, and the virtual OS image includes a virtual appliance image, wherein the virtual appliance image is associated with a virtual appliance and a kernel associated with the virtual appliance image; and memory in communication with the CPU and the storage area, the memory including a boot loader configured to initialize start-up using the kernel.

According to another embodiment of the present invention, a system of loading firmware as an operating system comprises a virtual appliance including a virtual appliance image for operating the virtual appliance; a kernel generator configured to provide a kernel mapped to the virtual appliance image; and a boot loader configured to load the kernel and the virtual appliance image as a virtual operating system (OS) image into the virtual appliance.

According to still yet another embodiment of the present invention, a computer program product for loading an operating system into a networking component, the computer program product comprising a computer readable storage medium having computer readable program code embodied therewith, the computer readable program code being configured to: produce a virtual appliance image of a virtual appliance; map a kernel to the virtual appliance image; provide a virtual operating system (OS) image of the virtual appliance including the virtual appliance image and the kernel; and load the virtual OS image into the virtual appliance.

DETAILED DESCRIPTION

Figure 1:
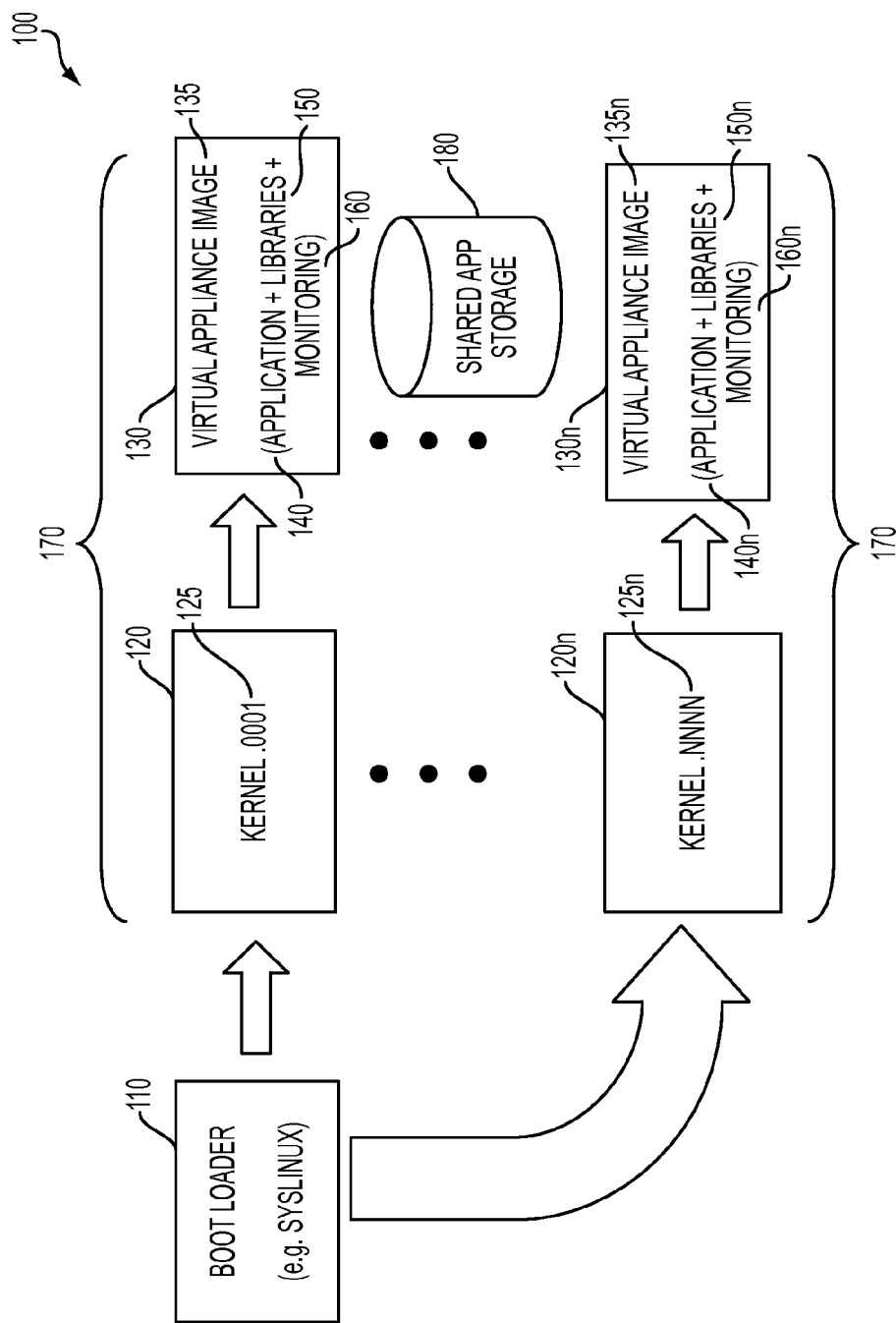
FIG. 1 is a block diagram of a system for loading a firmware image in a virtual appliance in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As generally described herein, system images for running applications on a switching network are provided as virtual images that can be run in a simulated environment and verified as functional prior to being loaded into a running environment. The virtual images may map the kernel with a virtual appliance into a single system. Each virtual image may occupy a distinct slot in storage so that any versions may be easily accessible and reinstituted into operation without the need to downgrade operating system versions sequentially.

Referring now to FIG. 1, a system 100 is shown for producing firmware images as virtual images for use by an operating system on a network component. The system 100 may include a boot loader 110, a kernel generator 120, and a virtual appliance 130. An independent common storage area 180 may provide storage for common files between system images such as configuration, statistics, databases and other files that would be shared between system images. In some embodiments, these files may be unique to the network component and may be stored in an independent storage location outside of the system images. The virtual appliance 130 may produce a virtual appliance image 135 of firmware used by the virtual appliance 130. The virtual appliance image 135 may provide instructions for use in operating, for example, a networking switch (not shown). The virtual appliance image 135 may include, for example, application data 140 of an application being run on the virtual appliance 130, operating system libraries 150, and a monitoring tool 160. It will be understood that other data related to running an operating system may also be included in the virtual appliance image 135. The boot loader 110 may be configured to initialize start-up and load in a kernel 125 associated with the virtual appliance image 135. For example, a virtual BIOS may initiate the boot loading sequence. The kernel 125 may be provided by the kernel generator 120. The kernel 125 may be Linux based. The kernel 125 may include a boot manager coordinating start-up sequences. The boot manager component may be an application that resides on an initramfs file system that is embedded inside the kernel image.

In a conventional virtual appliance, a boot loader may be used to select different kernels but may use a common operating system platform. The system 100 may map the kernel 125 to the virtual appliance image 135. For example, the system 100 may provide a self-contained virtual image of an operating system 170 (also referred to simply as virtual OS image(s) 170) comprising the kernel 125 and the virtual appliance image 135. The virtual OS image 170 may be structured, having a "/flash" file and startup scripts in a consistent location so an "intramfs" may start each virtual OS image 170 correctly. Thus, as modifications to the virtual appliance are created, (for example, changes to the application data 140, the operating system libraries 150, or the monitoring tool 160), a new or distinct virtual OS image 170 with an updated kernel 125 and updated virtual appliance image 135 may be created. The updated kernels 125 may be distinct versions of one another each associated with its respective version of the virtual OS image 170. The boot manager in each kernel 125 may maintain the same logic and start-up sequence. In an exemplary embodiment, the system 100 provides an infinite number of virtual OS images 170. For sake of illustration, the elements of the virtual OS image 170 are represented with a subscript "n" denoting the existence of "N" number of like elements comprising the virtual OS image 170 being produced according to exemplary embodiments herein. The system 100 can accommodate N+1 virtual OS images 170.

As upgraded versions of the virtual OS image 170 are created, the various versions of the virtual OS images 170 may be stored for as individual files. The storage area 180 may be a common storage, for example, a virtual disk device that is used to enable sharing of application data between virtual OS images 170. Each virtual OS image 170 may occupy a "slot" in the storage area 180. Thus, there may be N+1 slots available to store a plurality of virtual OS images 170.

It may be appreciated that by mapping the kernels 125 to the virtual appliance images 135, distinct copies of virtual OS images 170 are stored and easily accessible for loading. In addition, a virtual OS image 170 may be simulated beforehand in the same environment as would be run by a user and the integrity of operating system may be verified. Thus, as software components are upgraded in a system, their compatibility with the rest of the operating system may be troubleshot before implementation on a switch.

Figure 2:
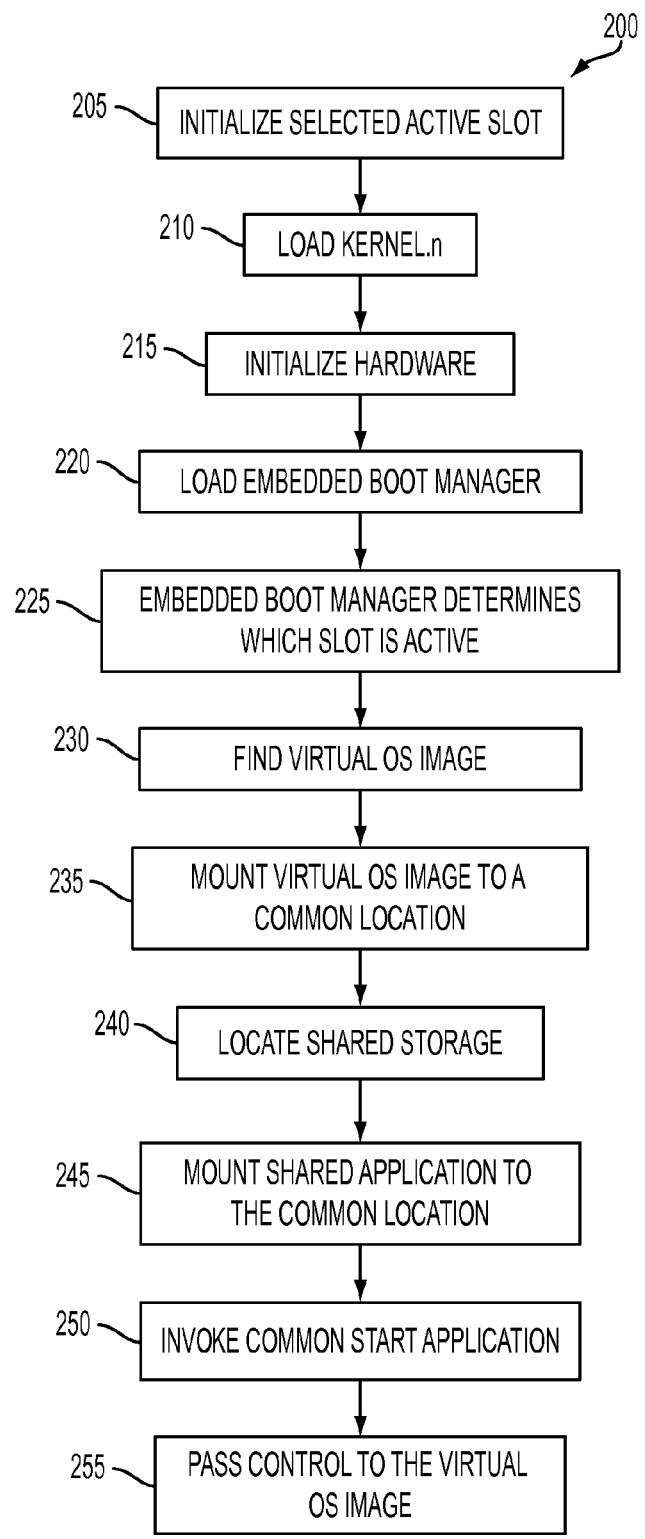
FIG. 2 is a flowchart of a process of loading a firmware image in a virtual appliance in accordance with another exemplary embodiment of the present invention.

Referring now to FIG. 2, a process 200 for loading a virtual image OS 170 is shown. The boot loader 110 may select 205 which "firmware" virtual OS image 170 to initialize and determine which kernel 125 to load. The virtual OS image 170 may be identified by a slot number, for example, "Image in slot 1". The boot loader 110 may load 210 the kernel 125 and initialize 215 the virtual hardware. Control may then pass to the boot manager. The file system, for example, the virtual appliance image 135 may be built into the kernel 125 itself and contains the boot manager software. The boot manager may be loaded 220. The boot manager may look at the kernel's boot command line (/proc/cmdline) and may determine 225 the slot that has been loaded by referring to the slot's identifier. For example, the boot manager may tag the slot by passing that information into the kernel 125 when it loads it. The boot manager may determine which slot identifier is the active slot. The active slot may be user selected or may be pre-designated as a factory default. When a slot is identified as active, the boot manager may boot from that slot. The boot manager may then find 230 the associated virtual OS image 170 that is stored in shared storage area 180. The boot manager may mount 235 the virtual OS image 170 into a common location on the shared storage area 180, for example, "/mnt/active". The common location may allow control to be handed off between the boot manager and the virtual appliance application 140. The boot manager may perform a sanity test to make sure the virtual OS image 170 is valid. The boot manager may locate 240 the shared storage area 180 and mount 245 the shared virtual appliance application 140 to storage, for example, a virtual disk, inside that common location (eg. /mnt/active/flash). The boot manager may invoke 250 a common start application to pass control 255 to the software that resides on the virtual OS image 170. The common start application may be located in the same place in each virtual OS image 170, for example, on a line labeled "/start/init-virtual-appliance". The boot manager may load the virtual OS image 170 and initialize the virtual appliance application. The shared system storage may be accessed for running the application.

Figure 3:
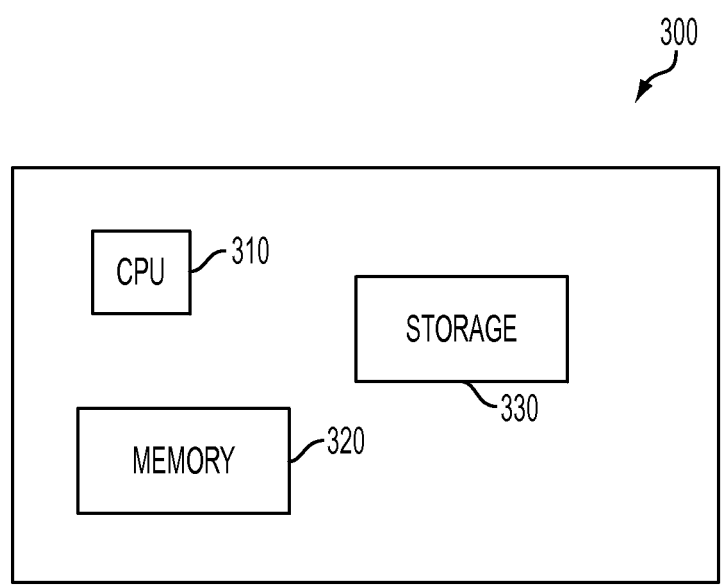
FIG. 3 is a block diagram of an exemplary host machine employing a virtual appliance with one or more firmware images loaded via the process of FIG. 2.

Referring now to FIG. 3, a host machine 300 is shown according to an exemplary embodiment of the present invention. The host machine 300 may be a personal computer, a server, or a switch. The host machine 300 may be a virtual device. The host machine 300 may include a CPU 310, memory 320, and data storage 330. The host machine 300 may be configured to house the elements of the system 100 and perform the activities of the process 200. For example, the CPU 310 may coordinate the actions of the boot loader 110. The memory 320 may be configured to store program instructions and data, for example, related to boot loading. The storage are 330 may hold data related to the shared storage 180.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A host machine, comprising:
a central processing unit (CPU);
a storage area connected to the CPU wherein the storage area includes:
a first virtual operating system (OS) image, the first virtual OS image includes:
a virtual appliance image including application data and operating system libraries associated with a virtual appliance, and
a kernel corresponding to the virtual appliance image, wherein the kernel is mapped the application data and the operating system libraries of the virtual appliance, wherein a modification to the application data or to the operating system libraries provides a second virtual OS image, the second virtual OS image including an updated kernel updated in response to a modification in the virtual appliance and an updated virtual appliance image provided in response to the modification in the virtual appliance; and
memory in communication with the CPU and the storage area, the memory including a boot loader configured to:
initialize start-up using the kernel, and
load either the first virtual OS image or the second virtual OS image into the virtual appliance.

2. The host machine of claim 1, wherein the host machine is a server or a switch.

3. The host machine of claim 2, wherein the server or switch is virtual.

4. A system, comprising:
a virtual appliance including a virtual appliance image for operating the virtual appliance;
a kernel generator configured to provide a kernel mapped to the virtual appliance image; and
a boot loader configured to load the kernel and the virtual appliance image as a first virtual operating system (OS) image into the virtual appliance;
a processor configured to:
update the kernel in response to a modification in the virtual appliance;
update the virtual appliance image in response to the modification in the virtual appliance;
provide a second virtual OS image including the updated kernel and the updated virtual appliance image; and
load either the first virtual OS image or the second virtual OS image into the virtual appliance, and
a shared storage area in a tangible storage medium configured to store a plurality of virtual OS image versions, the plurality of virtual OS image versions including respectively distinct versions of the kernel.

5. The system of claim 4, wherein the shared storage area is a virtual disk.

6. The system of claim 4, wherein the plurality of virtual OS image versions are each identified according to a slot occupied in the shared storage area.

7. The system of claim 4, wherein the virtual appliance image includes application data of an application being run on the virtual appliance.

8. The system of claim 7, wherein the virtual appliance image includes an operating system library.

9. The system of claim 8, wherein the virtual appliance includes an updated version of the virtual OS image when a modification occurs in the operating system library.

10. A computer program product for loading an operating system into a networking component, the computer program product comprising a non-transitory computer readable storage medium having computer readable program code embodied therewith, the computer readable program code being configured to:
produce a virtual appliance image of a virtual appliance;
map a kernel to the virtual appliance image;
provide a first virtual operating system (OS) image of the virtual appliance including the virtual appliance image and the kernel;
update the kernel in response to a modification in the virtual appliance;
update the virtual appliance image in response to the modification in the virtual appliance;
provide a second virtual OS image including the updated kernel and the updated virtual appliance image; and
load either the first virtual OS image or the second virtual OS image into the virtual appliance.

11. The computer program product of claim 10, wherein the modification in the virtual appliance occurs in an operating system library.

12. The computer program product of claim 10, the computer readable program code being configured:
to store a plurality of versions of the virtual OS image;
identify a selected version of the virtual OS image for loading; and
load a kernel associated with the selected version of the virtual OS image.

13. The computer program product of claim 12, wherein the plurality of versions of the virtual OS image are stored as slots in a common storage area and identified for selection according to a slot identifier.

14. The computer program product of claim 10, wherein the virtual appliance image is of firmware configured for use in a network switch.

15. The computer program product of claim 12, wherein each kernel associated with each of the plurality of virtual OS images is distinct from each other kernel.

* * * * *